No. 748,056. PATENTED DEC. 29, 1903.
H. A. DULINSKY.
ROD COUPLING.
APPLICATION FILED APR. 9, 1903.
NO MODEL.
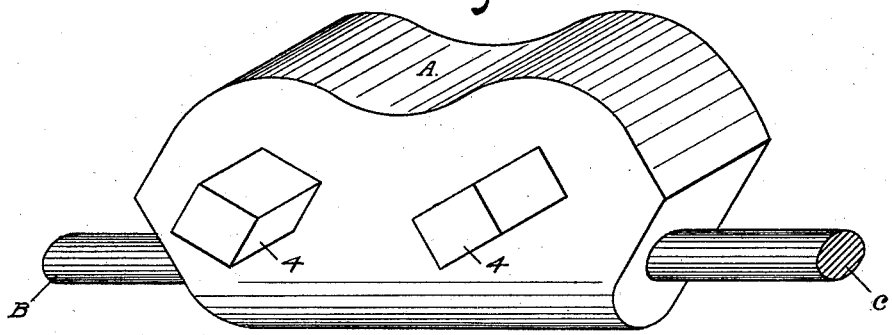
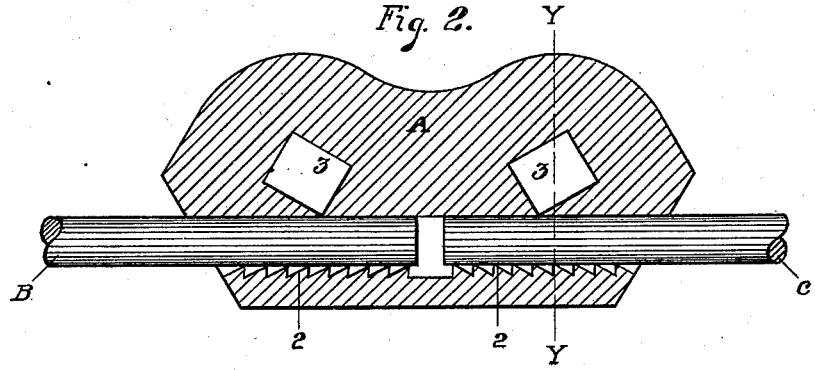
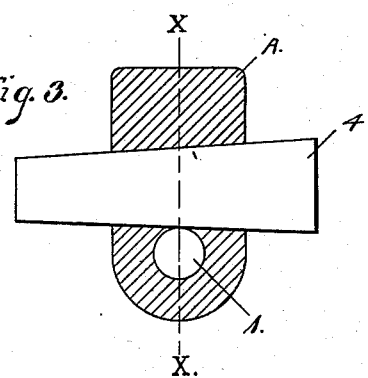
WITNESSES:
H. A. DULINSKY.
INVENTOR.
BY
ATTORNEY.

No. 748,056. Patented December 29, 1903.

UNITED STATES PATENT OFFICE.

HENRY A. DULINSKY, OF NOTTINGHAM, INDIANA.

ROD-COUPLING.

SPECIFICATION forming part of Letters Patent No. 748,056, dated December 29, 1903.

Application filed April 9, 1903. Serial No. 151,748. (No model.)

*To all whom it may concern:*

Be it known that I, HENRY A. DULINSKY, a citizen of the United States, residing at Nottingham, in the county of Wells and State of Indiana, have invented new and useful Improvements in Rod-Couplings, of which the following is a full, clear, and exact description and specification.

My present invention relates to improvements in couplings, and more particularly to that class of couplings designed for the purpose of connecting together rods or pipes, in which several objects are sought and attained by the construction shown in the drawings, and described in the following specification.

The object of my invention, broadly speaking, is to provide a coupling for securely connecting the ends of rods or pipes without the necessity of employing the ordinary threaded connection.

Another object is the provision of a rod-coupling of simple construction which may be employed for easily and quickly connecting the ends of rods or the like securely and firmly and at the same time will be easy of disconnection when desired.

Another object is the provision of an article of manufacture, a coupling for rods or the like, consisting of a minimum of mechanical parts, efficient and easy of operation, and which can be manufactured and sold at a comparatively low price.

Other objects and advantages of my invention will appear from the accompanying drawings, forming a part of this specifiation, and also from the following specification and from the claims hereunto appended.

Referring now to the drawings, Figure 1 is an isometrical view of my invention in perspective. Fig. 2 is a central longitudinal section of my invention, taken on the line X X of Fig. 3; and Fig. 3 is a cross-section of same, taken on the line Y Y of Fig. 2.

Similar indices refer to and denote like parts throughout the several views.

I will now take up the description of my invention in its preferred construction in detail, which I will state as briefly and compactly as I may.

The letter A denotes an oblong block of a shape adapted to give the greatest amount of strength with the least amount of material of which it is composed, with an opening 1 longitudinally therethrough at its lower portion and of a size to loosely admit the ends of rods, as represented by B and C, to be coupled. On the inside of the opening 1, on its lower face, are formed the oppositely-disposed sets of teeth or notches 2, each set pointing inward toward the center of the block, as shown in Fig. 2. Through the block A, at right angles to said opening 1, are the two oblong or square openings 3, Fig. 2, formed at an angle in order that one of each of their corners will be lower than the other three corners, as shown, and the lower points of the openings 3 will pierce the opening 1, as shown in Figs. 2 and 3. The openings 3 taper slightly from one side of the block to the other, as shown in Fig. 3. I provide two splines or keys 4 somewhat longer than said openings 3, of the same angle of taper thereof and formed larger at one end and smaller at the other than are said openings, and they are adapted to be inserted therein, as shown in Figs. 1 and 3. It will now be apparent that should the ends of the rods B and C be inserted in the opening 1 from opposite directions if the splines 4 be now driven into their respective openings 3 the lower edges of the splines will contact with the upper point of the peripheries of the rods and contact the rods against the respective sets of teeth 2, and at the same time the lower edges of the splines will act as teeth engaging the rods, and the rods will thus be securely clamped in the block A.

My invention is particularly expeditious in connecting a line of rods adapted to operate endwise for pumping oil-wells or the like at a distance from the motive power; but the invention is also adapted for other purposes, which will suggest themselves to the ordinary mechanic.

From the above description, taken in connection with the accompanying drawings, it will be apparent that I have produced an improved coupling embodying the objects otherwhere referred to in this specification and which are correlated in the following claims.

While I have illustrated and described the best means to me known at this time for carrying out the objects of my invention, I wish it to be understood that I do not restrict myself to the exact details of construction shown and described, but hold that any slight changes or variations in such details as would suggest themselves to the ordinary mechanic would clearly fall within the scope of my invention.

Having now fully shown and described my invention and its adaptation for the purposes set forth, what I claim, and desire to secure by Letters Patent of the United States, is—

1. A rod-coupling comprising in combination, the oblong block, a longitudinal opening through the block to receive the ends of rods, two sets of oppositely-disposed teeth formed in the lower portions of said opening, rectangular opening formed through said block at right angles to said longitudinal opening and the lower portions thereof opening thereinto, splines adapted to be inserted into said rectangular or oblong openings with their lower corners adapted to extend through said longitudinal opening, all substantially as shown and described and for the purposes set forth.

2. A rod-coupling comprising in combination, a block A, a central longitudinal opening through the lower portion of the block, teeth formed on the lower part of the interior of said opening, the oblong tapering openings formed at an angle through the said block above said longitudinal opening and cutting through the upper edge thereof, splines adapted to fit into said oblong openings with their lower edges adapted to cross the upper part of the longitudinal opening, substantially as shown and described.

3. The combination with the rods B and C, the block A with a longitudinal opening 1 therethrough, the oblong openings through the block A at right angles to the opening 1, splines or keys 4 adapted to enter said oblong openings, and the oppositely-disposed sets of teeth in the opening 1, all substantially as shown.

In testimony whereof I have hereunto signed my name to this specification in the presence of two subscribing witnesses.

HENRY A. DULINSKY.

Witnesses:
   W. B. KIRKWOOD,
   H. A. WARNER.